(12) United States Patent
Sayer

(10) Patent No.: US 6,267,023 B1
(45) Date of Patent: Jul. 31, 2001

(54) LOWER STEERING ARM ASSEMBLY FOR AN IMPLEMENT ATTACHING DEVICE

(75) Inventor: John Sayer, Bridgnoth (GB)

(73) Assignee: GKN Walterscheid GmbH, Lohmar (DE)

(*) Notice: Subject to any disclaimer, the term of this patent is extended or adjusted under 35 U.S.C. 154(b) by 0 days.

(21) Appl. No.: 09/425,817

(22) Filed: Oct. 22, 1999

(30) Foreign Application Priority Data

Oct. 24, 1998 (DE) .............................................. 198 49 070

(51) Int. Cl.[7] ....................................................... G05G 1/00
(52) U.S. Cl. ............................................... 74/491; 172/439
(58) Field of Search ........................... 74/491, 492, 593; 464/158, 106, 147; 280/93–511; 172/439

(56) References Cited

U.S. PATENT DOCUMENTS 2,630,088 * 3/1953 Muecke ................................... 74/491
3,853,335   12/1974 Heckenkamp .
5,327,978   7/1994 Bremner .

FOREIGN PATENT DOCUMENTS 0 608 750 A1   8/1994 (EP) .

* cited by examiner

*Primary Examiner*—Dirk Wright
(74) *Attorney, Agent, or Firm*—Harness, Dickey & Pierce, P.L.C.

(57) ABSTRACT

An assembly with a lower steering arm has a strut 1 and an attaching end 16. To achieve a cost-effective design while at the same time reducing the play between the attaching end 16 and the end of the strut 1 received therein, the attaching end 16 includes a base member 18 and a cover 19. A blocking pawl 34 is supported in the base member 18. The cover 19 is welded to the base member 18 and comprises a stop face 30 for the end face 10 of the strut 1. Thus, any tolerances in the region of the base member 18 provided in the form of a forging do not affect the position of the stop face 30. The latter can be aligned when connecting the base member 18 and the cover 19. Because of its setting contour, the actuating lever 43 can be used for both the right hand and the left hand lower steering arm.

10 Claims, 6 Drawing Sheets

LOWER STEERING ARM ASSEMBLY FOR AN IMPLEMENT ATTACHING DEVICE

CROSS-REFERENCE TO RELATED APPLICATIONS

This application claims priority upon German application 198 49 070.4 filed Oct. 24, 1998, which is incorporated herein by reference.

BACKGROUND OF THE INVENTION

The invention relates to a lower steering arm assembly for an implement attaching device. The assembly includes a strut pivotably attachable to a tractor or a self-driving working machine. An attaching end is removably fixed to the free end of the strut. The attaching end provides a connection with an implement.

EP0 608 750 A1 describes a lower steering arm assembly for a three-point attaching device of a tractor. A forged strut, at one end, has a ball eye to be connected to a pivot pin at the rear of the tractor. The strut has a rectangular cross-section and is stepped. Near its free end, the strut is forged to be U-shaped. A cover is welded to the arms of the U-shaped portion forming a closed chamber. The forged web of the strut has a formed-in pocket. A blocking pawl is pivotably arranged around a pin connection in the pocket. The blocking pawl is spring loaded into the blocking position where it is pivoted out of the chamber. Two further pins are provided at a distance from the pivot pins. One of the pins is guided outwardly through an opening in one of the arms of the U-shaped portion. A knob is on the end of the pin to enable manual manipulation of the pawl. Thus, it is possible to move the blocking pawl, loaded by the spring, into a position which is withdrawn into the pocket. A stop face is provided at the end of the chamber of the forged strut. An insertable end is inserted into the chamber. The end has a substantially rectangular cross-section. A recess extends through the entire side face of its shank. The end has a supporting face for the locking face of the blocking pawl. The supporting face extends substantially transversely to the longitudinal axis of the insertable end. The end face of the insertable end comes to rest against the stop face of the chamber. At its end projecting from the chamber, the insertable end has a ball eye. The ball eye provides a connection with a corresponding attaching pin of the implement. After the blocking pawl has been retracted, the insertable end may at least be partially extracted from the chamber to facilitate the coupling operation. The setting recesses in the shank enable angular adjustment relative to the strut remaining at the tractor in order to facilitate the coupling operation. By reversing the tractor, the insertable end can be driven into the chamber. As this occurs, the blocking pawl, after the end face of the shank of the insertable end has stopped against the stop face of the chamber, drops into the recess in the side face of the shank.

The stop face at the end of the U-shaped recess of the strut must be machined to be able to observe the tolerances required for accurate locking. The stop face is adapted to the distance between the end face of the shank of the insertable end and the blocking face of the recess, and also to the locking face of the blocking pawl. In practice, close tolerances cannot be observed because subsequent machining, when the cover has already been associated with the U-shaped region, is not possible. This design makes it necessary for the entire strut to be forged, which, in turn, means high costs.

Furthermore, since the blocking pawl is supported by a journal, a great deal of machining is required. Finally, the actuating knob has to be associated with different parts, depending on whether it is used for the left-hand or right-hand steering arm. In addition, due to the direction of the force acting on the actuating knob, remote actuation, by a cable operated from the tractor seat, is not possible.

SUMMARY OF THE INVENTION

It is an object of the present invention to provide a lower steering arm assembly with an actuator for the locking mechanism between the attaching end and the strut. The actuator is suitable for a right-hand and a left-hand lower steering arm without modification.

In accordance with the invention, a lower steering arm assembly includes a strut and an attaching end. The strut constitutes one component and the attaching end a further component. One of the components includes a blocking pawl. With the help of an actuator, the blocking pawl is pivotable between a locked position and an open position. In the locked position, the blocking pawl engages a recess of the other component. In the open position, the blocking pawl is disengaged from the recess. The blocking pawl is loaded by a spring to assume the locked position. The actuator includes an actuating lever. The lever is pivotable around a pivot axis and includes at least one actuating arm which extends radially from the pivot axis. The actuator includes a setting contour on which the actuating arm is at least partially supported. The contour includes an indentation with a base. Setting faces risingly extend in opposing directions of the actuating lever in the supporting region. A connecting element connects the actuating lever with the blocking pawl at a distance from the pivot axis of the blocking pawl.

The setting contour is of a symmetric design. Accordingly, when the actuating arm moves in one of the pivoting directions, whether it is a right-hand or left-hand steering arm, a displacement takes place which is followed, in the opening sense, by the blocking pawl articulating at the actuating lever via the connecting element. Thus, it is possible to associate the actuating arm with a towing element which can be gripped and actuated from the tractor seat. Thus, an unlocking operation can be carried out when depositing or uncoupling the implement. To facilitate the uncoupling operation, the connecting ball joint eye, at the attaching end, is able to carry out vertical movements relative to the strut. In this way, distortion cannot occur. The ball joint eye and the attaching end are load-free so that the operative is able to unfasten the connection between the attaching end and the implement without having to apply any force.

In a preferred embodiment, the connecting element is in the form of a tow bar. The actuating lever is pivotally arranged on the tow bar. The longitudinal axis of the tow bar forms the axis of rotation of the actuating lever. The actuating lever, in at least one direction of the longitudinal axis which corresponds to the direction of movement of the tow bar into the open position, is firmly supported on the tow bar.

Particularly advantageous actuating conditions are obtained if two actuating levers are provided. The levers extend diametrically from the pivot axis of the actuating lever. Both levers are associated with a setting contour. This results in the connecting element being symmetrically loaded. The load on the guiding means for the connecting element is reduced. Accordingly, canting or jamming cannot occur. In a further embodiment of the invention, the blocking pawl is additionally secured by a pre-tensioned spring. The spring holds the blocking pawl in the recess. The actuating lever is associated with at least one securing arm. The securing arm is arranged to be circumferentially offset relative to the actuating arm. Thus, when the actuating arm is in the locked position, the securing arm is in contact with the base of the setting contour. Also, the securing arm is covered by a fixed securing projection which prevents the blocking pawl from being displaced into the open position.

To achieve symmetric loading, two securing arms are provided. The securing arms extend diametrically away from the pivot axis. An advantageous assembly is obtained if the recess of the strut and the blocking pawl, the actuating lever, the connecting element and the setting contour are associated with the attaching end which can be plugged onto the second end of the strut. In this case, the blocking pawl is received in a pocket of the attaching end. The connecting element, in the form of a tow bar, is guided outwardly and, on its outside, rotatably carries the actuating lever.

To secure the blocking pawl in the locked position, a stop bushing is provided. The stop bushing is arranged co-axially around the tow bar. The stop bushing is displaceably accommodated in the bore. On the one hand, the stop bushing is axially supported on the actuating lever held at the tow bar in only one longitudinal direction. On the other hand, the other end serves as a securing stop for the blocking pawl.

A spring disc is provided to load the actuating lever so that it is always held in contact with the setting contour.

Alternatively, the blocking pawl can be secured. Here, the actuating lever is connected to the tow bar so that it is axially unmovable.

From the following detailed description, taken in conjunction with the accompanying drawings and subjoined claims, other objects and advantages of the present invention will become apparent to those skilled in the art.

DETAILED DESCRIPTION OF THE PREFERRED EMBODIMENT

Figure 1:
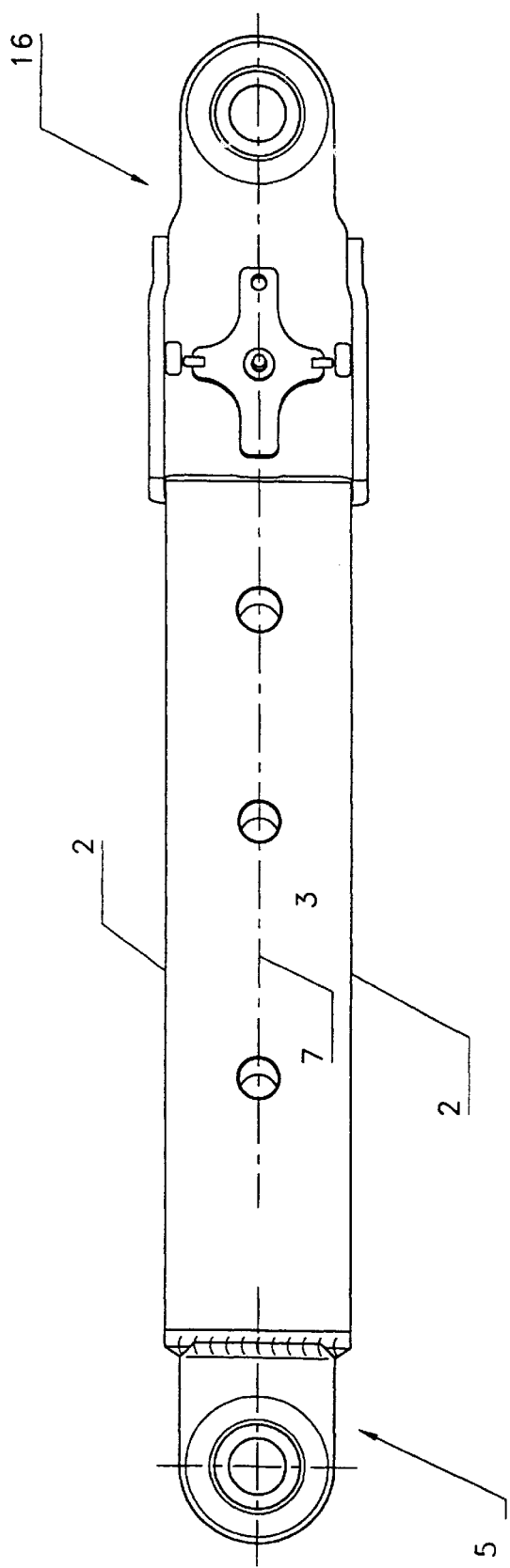
FIG. 1 is a side plan view of a first lower steering arm assembly in accordance with the invention.
Figure 2:
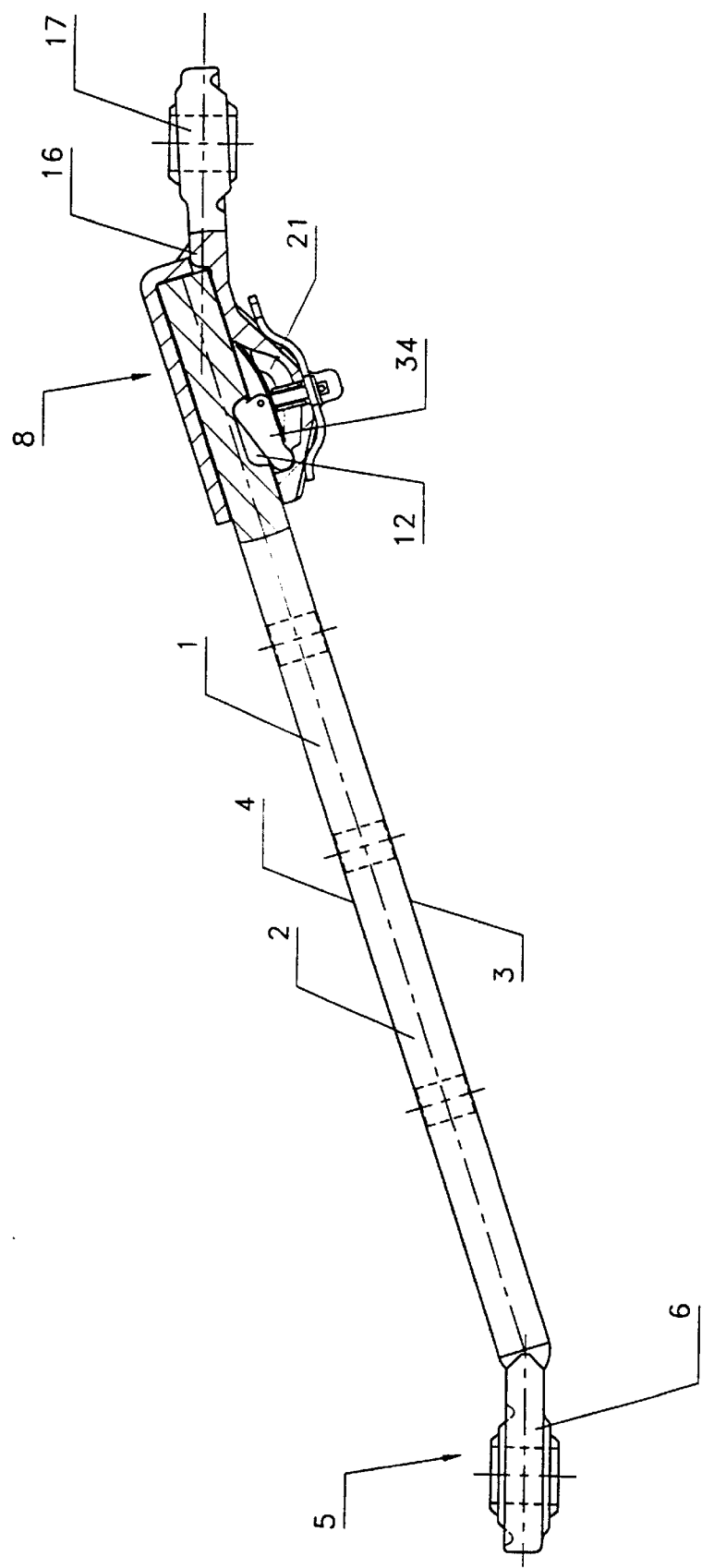
FIG. 2 is a plan view partially in section, and rotated ninety (90°) degrees, according to FIG. 1.

A first embodiment will be explained in greater detail with reference to FIGS. 1 to 6. The lower steering arm assembly includes a strut 1 which is produced from a flat material. The strut 1 has two narrow faces 2 and the two side faces 3, 4. A ball joint eye 6 is welded to the first end 5 of the strut 1. The ball joint eye is pivotably secured to the tractor or to a self-driving implement.

The strut 1 defines a longitudinal axis 7 and has a second end 8 remote from its first end 5. Towards the second end 8, setting recesses 9 are worked into the strut 1. The setting recesses 9 start from the narrow faces 2 and are positioned at a distance from the end face 10 at the second end 8. Narrow faces 2a are in the region between the end of the setting recesses 9 and the end face 10. The narrow faces 2a are stepped relative to the narrow faces 2. The height of the strut 1 in the region between the narrow faces 2 is greater than between the two narrow faces 2a.

Two inclined faces 11 start at the end face 10. The two inclined faces 11 end in the stepped narrow faces 2a and serve to center an attaching end 16. A recess 12 is worked into the side face 3 of the strut, at a distance from the end face 10. In the plan view, the recess 12 is circular. The recess 12 includes a longitudinal axis 12a. The recess 12 is in the form of a truncated, cone-shaped indentation. The inner face of the recess 12 forms the blocking face 13. The blocking face 13 extends at an angle relative to the longitudinal axis 12a and ends with a curvature 14 in the bottom 15.

The attaching end 16, plugged onto to the second end 8 of the strut 1, also includes a ball joint eye 17. The eye 17 is connected to an implement to be attached or to be carried by the two lower steering arms arranged in parallel relative to one another at the tractor. The attaching end 16 includes two parts, a base member 18 and a cover 19. The base member 18 is provided in the form of a forging. A pocket 21 starts from a planar face 20 of the forging. The pocket is limited by an outwardly directed curvature. The pocket 21 defines a bearing face 22 which is delimited by part of the inner face of a cylinder having an axis 33. The pocket 21 provides support for a blocking pawl 34. The base member 18 has a bearing recess 23 which accommodates a bearing ball 24. The bearing ball 24 has a through-bore 25. The through-bore 25 receives a receiving pin of the implement to be attached.

Figure 3:
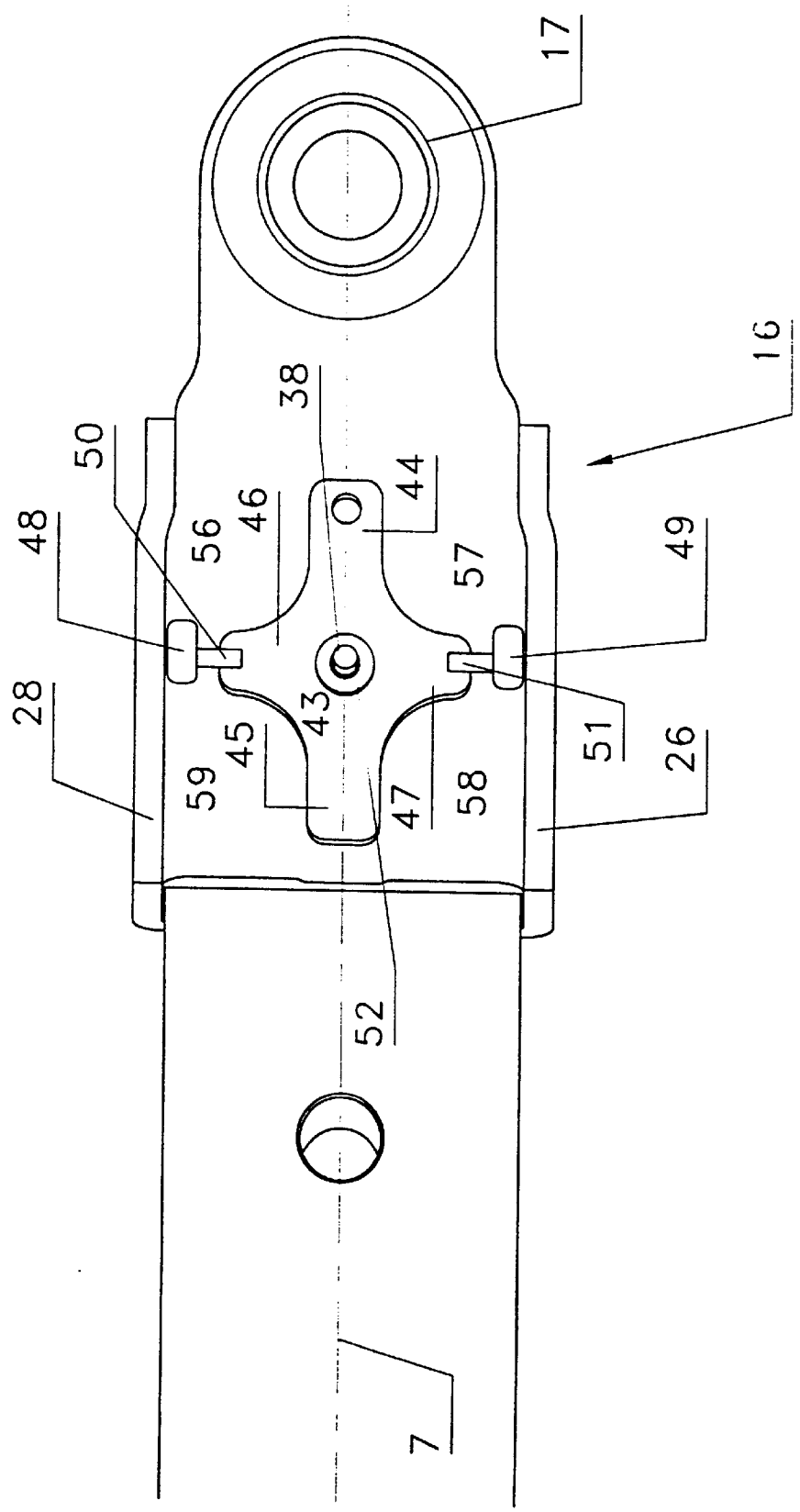
FIG. 3 is an enlarged plan view of the attaching end according to FIG. 1.
Figure 4:
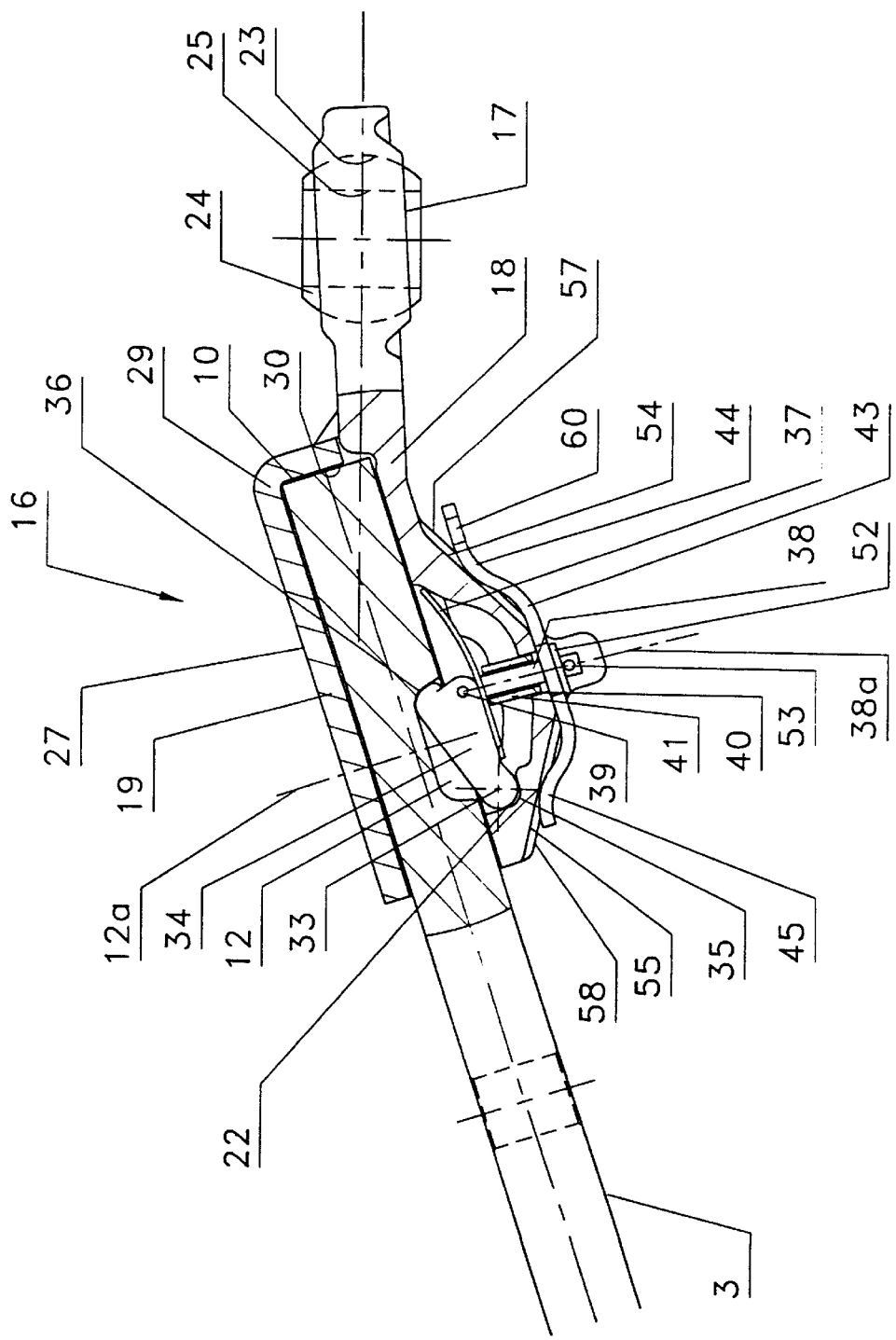
FIG. 4 is an enlarged section view of the selected region of FIG. 2.

The cover 19 has a U-shaped cross-section and the two arms 26, 28. The arms 26, 28 are connected to one another by a web 27. The arms 26, 28 receive the base member 18 between them and are welded thereto. Towards the ball joint eye 17, the cover 19 is provided with an end wall 29. The inside of the end wall 29 forms the stop face 30. An indentation 31 is provided in the area of transition between the inner face of the web 27 and the stop face 30. The planar face 20 of the base member 18, the inner faces of the two arms 26, 28 and of the web 27, as well as the stop face 30 of the end wall 29 of the cover 19, define a chamber 32. The second end 8 of the strut is received in the chamber 32. FIGS. 3 and 4 show the inserted condition. The attaching end 16 is fully plugged into the second end 8 of the strut 1. The end face 10 of the strut 1 is in contact with the stop face 30. The indentation 31 ensures that the end face 10 fully rests against the stop face 30. Thus, positive supporting conditions exist. In addition, the two faces 10, 30 are locked to one another by a blocking pawl 34.

The blocking pawl 34 has a supporting face 35. The supporting face 35 is adapted to the inner face, blocking face 13, and corresponds to the bearing face 22. Thus, the blocking pawl 34 is pivotable around the pivot axis 33 which forms the cylinder axis. It can be seen that the pivot axis 33 is arranged at a distance from the longitudinal axis 12a of the recess 12 and intersects same at a right angle.

At the end facing away from the supporting face 35, the blocking pawl 34 has a locking face 36. The locking face 36 is adapted to the shape of the inner face 13 forming the blocking face and to the curvature 14 of the recess 12. By selecting this shape, the pivot movement into the recess 12 is facilitated. FIG. 4 shows the engaged position. The blocking pawl 34, by its locking face 36, engages the recess 12. The blocking pawl 34 holds the attaching end 16 on the second end 8 of the strut 1. Thus, the strut 1 is able to apply tensile forces to the ball joint eye 17.

The cover 19 is in the form of a formed plate metal part or casting. The cover 19 may be produced more accurately than the forged base member 1. Thus, by associating the stop face 30 with the cover 19, it is possible, when producing the connection between the base member 18 and the cover 19, to compensate for any deviations. Compensation occurs by displacing the cover 19 relative to the base member 18. Thus, it is possible to transfer the exact distance measurements of the recess 12 relative to the end face 10. The end face is machined in a chip-forming way to the attaching end 16 to ensure that the blocking pawl 34 locks in as play-free a way as possible. The blocking pawl 34 includes a yoke-shaped portion. A tow bar 38 is received between the two yoke arms. The tow bar 38 is pivotably connected to the blocking pawl 34 by a transversely extending pin 39. The tow bar 38 is cylindrical and guided outwardly through a bore 40 in the wall of the base member 18. The bore 40 is in the region of the pocket 21, which receives the blocking pawl 34. A stop bushing 41 is positioned co-axially around the tow bar 38. The stop bushing 41 is displaceable by a limited amount. The stop bushing 41 projects inwardly into the pocket 21 onto the blocking pawl 34 in the locked condition of the blocking pawl 34. The bushing 34 is prevented from unintentionally pivoting into the unlocked position wherein the locking face 36 is disengaged from the recess 12. An actuating lever 43 is attached to the outside of the tow bar 38. A bore holds the actuating lever on the tow bar so as to be rotatable around the axis of rotation 38a. The axis of rotation 38a is defined by the longitudinal axis of the tow bar 38. Furthermore, the actuating lever 43 is secured on the tow bar 38 against axial displacement in at least one direction by a pin 53. A spring disc 52 is positioned between the pin 53 and the outer face of the actuating lever 43. The spring disc 52 suppresses any play, even in the locked condition, to prevent the actuating lever 43 from rattling. The stop bushing 41 is supported by its other end against the actuating lever 43.

The actuating lever 43 has four arms, two actuating arms 44, 45 and two securing arms 46, 47. Actuating arm 44 is provided with a bore 60 to enable the connection of towing means. The two securing arms 46, 47 are arranged at a right angle relative to the two actuating arms 44, 45. Thus, a kind of cruciform shape is obtained. In addition, the two actuating arms 44, 45 are crimped twice. Thus, the arms 44, 45 project towards the outer face of the base member 18 in the region of the curved pocket 21. The outer face of the base member 18 is provided with a setting contour in the region of the pocket 21. For the locked condition as illustrated in FIGS. 3 and 4, an indentation is provided with base 54, 55 to the right and to the left of the tow bar 38. The two actuating arms 44, 45 rest on the base 54, 55 in the locked condition as illustrated in FIGS. 3 and 4. The arms 44, 45 are aligned substantially in the direction of the longitudinal axis 7.

Figure 6:
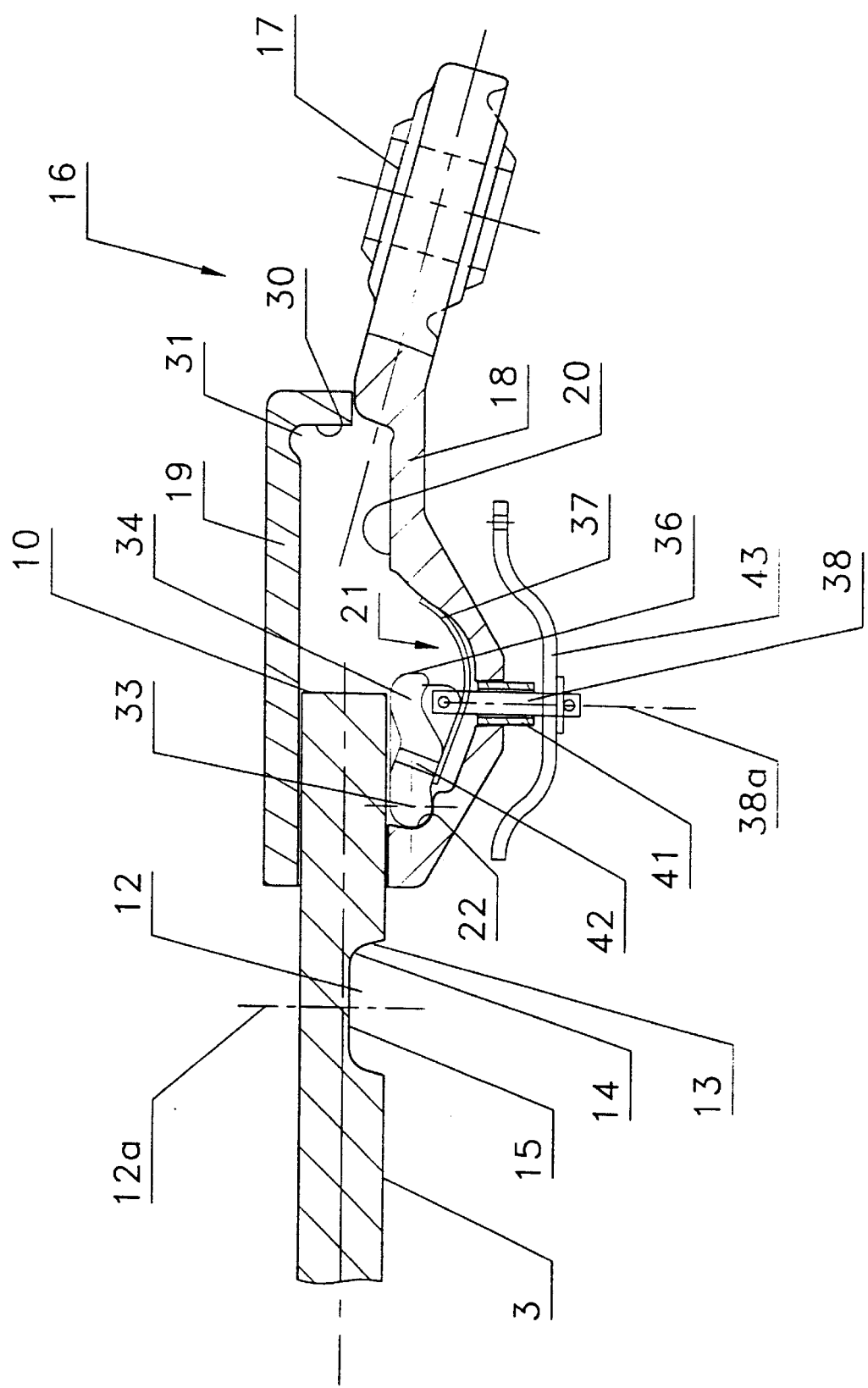
FIG. 6 is a section view like FIG. 4 of the attaching end relative to the strut in an extracted position.

Setting faces rise from the base 54, 55. Setting face 56 rises upwardly from the actuating arm 44. Setting face 59 rises upwardly from the actuating arm 45. Two rising setting faces 57, 58 are below the two actuating arms 44, 45. As the two actuating arms 44, 45 are crimped twice, they rest against the setting contour of the outside of the base member 18 in the region of the second crimping. The actuating lever 43 is pivoted counter-clockwise around the axis of rotation 38a of the tow bar 38 due to a towing element being acted upon. Via the bore 60, the lever 43 is articulated at the actuating arm 44. The actuating arm 44 moves from the base 54 upwards on the rising setting face 56. In order to achieve symmetric loading conditions, the second actuating arm 45 moves along the rising setting face 58 away from the base 55. This means that a tensile force is applied to the tow bar 38. The blocking pawl 34 is pivoted clockwise out of the recess 12 around the pivot axis 33 by its locking face 36, into a position as shown in FIG. 6. The stop bushing 41 also moves outwardly.

The blocking pawl 34 is additionally loaded towards its blocking position by a relatively strong leaf spring 31. The pawl 34 is loaded counter-clockwise. At one end, the spring 37 is supported on the inner contour of the pocket 21. The other end rests on the blocking pawl 34. The spring 37 is connected thereto by a holding pin 42 inserted into a bore of the blocking pawl 34. Furthermore, the spring 37 includes a slot through which the tow bar 38 is guided. Cams 48, 49 are on the outside of the base member 18, in the region of the pocket 21 to secure the blocking pawl 34 in the locked position. The cams 48, 49 include projections in the form of securing pins 50, 51 projecting towards the tow bar 38. In the locked condition, the securing arms 46, 47 are positioned underneath the securing pins 50, 51. The stop bushing 41 is held in its inwardly displaced position because it is supported against the locked actuating lever 43 and cannot escape. The blocking pawl 34 is positioned in the recess 12. When pivoted out of its engagement relative to the recess 12, the blocking pawl 34 would stop against the stop bush 41. When a tensile force acts on the actuating lever 43, the tow bar 38 is not displaced and consequently neither is the blocking pawl 34. In addition, this measure ensures that the blocking pawl 34 is locked. This means that even when vibrations occur, the blocking pawl 34 cannot pivot around the pivot axis 26 because its outer face comes to rest against the end face of the stop bushing 41. The stop bushing 41 cannot escape outwardly.

Figure 5:
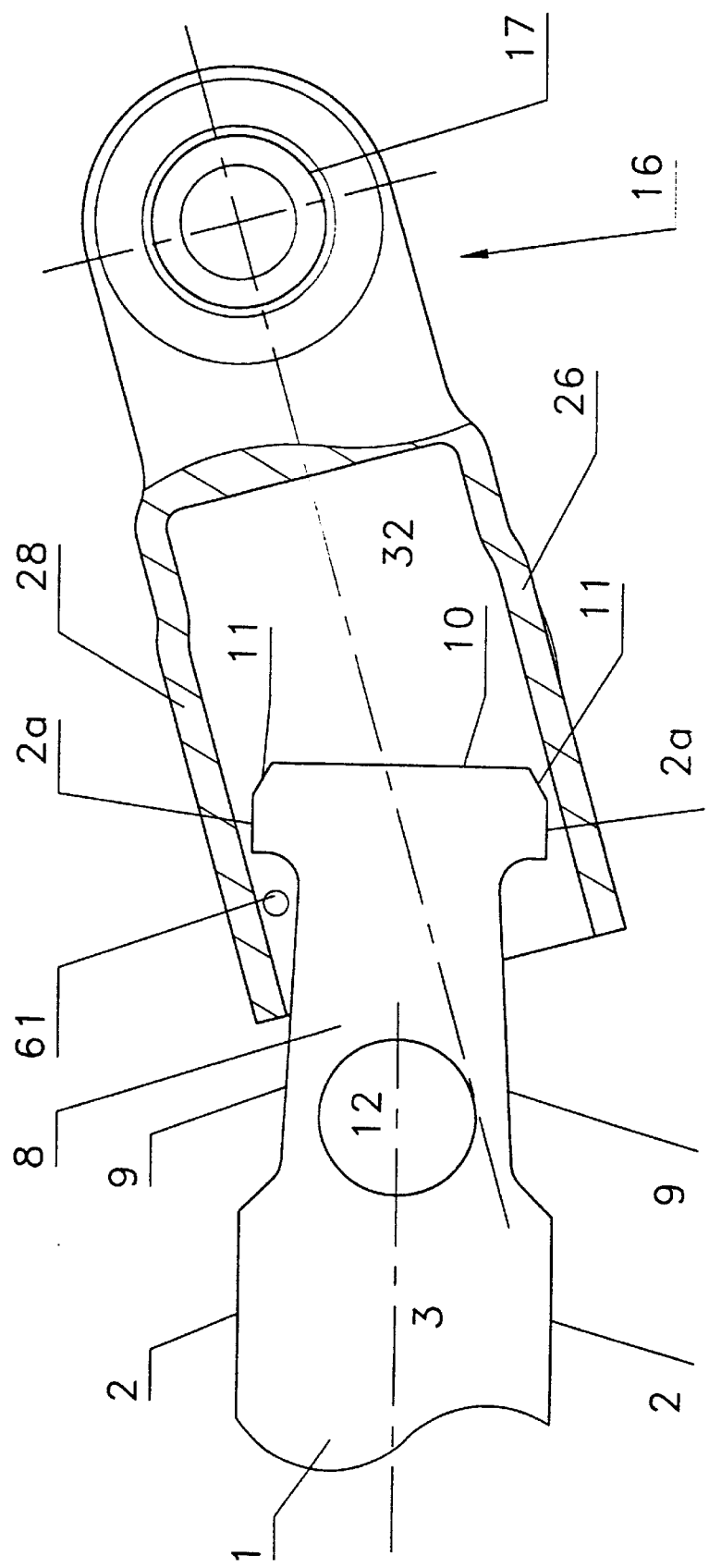
FIG. 5 is a partially in section diagrammatic view of the possible movements of the attaching end relative to the strut.

After the blocking mechanism has been released, after the blocking pawl 34 has been transferred into a position as shown in FIG. 6, the attaching end 16 can be pulled forward, away from the second end 8. FIG. 6 does not show the actual position of the actuating lever 43. Instead, for the sake of clarity, the actuating lever 43 is shown in a fully displaced, outward position. The lever 43 is out of contact with the outer face of the base member 18. FIG. 5, additionally, shows the attaching end 16 having been pivoted upwardly relative to the longitudinal axis 7 of the strut 1. The two stepped blocking faces 2a extend in the region of the chamber 32, while the faces of the shanks 26, 28 approach one another and change by following a constant course.

The inclined faces 11 assist centering onto this region. The extraction path of the attaching end 16 relative to the second end 8 is delimited by the stop pin 61, which passes through the chamber 32. The stop pin 61 is positioned in the region of a setting recess 9. The setting recesses 9 enable the attaching end 16 to pivot, as illustrated in FIG. 5. In addition, slight adjustment movements are possible in the horizontal direction. The pivoting possibility facilitates coupling of the implement to the tractor if there is a difference in height between the strut 1 and the attaching pin of the implement. After the implement has been coupled, it is possible, by reversing the tractor, to move the strut 1, via its second end 8, into the chamber 32 until the end face 10 comes to rest against the stop face 30 of the cover 19. The blocking pawl 34 engages the recess 12 under the force of the spring 37. The resistance required for driving in the strut 1 is provided by the weight of the implement to be coupled.

While the above detailed description describes the preferred embodiment of the present invention, the invention is susceptible to modification, variation and alteration without deviating from the scope and fair meaning of the subjoined claims.

What is claimed is:

1. A lower steering arm assembly for an implement attaching device, comprising:

a strut pivotably attachable to a tractor or a self-driving working machine, an attaching end removably fixed to the free end of the strut providing a connection with an implement;

the strut constituting one component and the attaching end a further component and with one of the components including a blocking pawl;

an actuator, said blocking pawl being pivotable between a locked position and an open position, in the locked position said blocking pawl engaging a recess of the other component and in the open position, the blocking pawl is disengaged from said recess, and a spring loading said blocking pawl for assuming the locked position, said actuator including an actuating lever which is pivotable around a pivot axis, at least one actuating arm extending radially from the pivot axis, said actuator further including a setting contour on which the actuating arm is at least partly supported and an indentation with a base, in opposed pivoting directions of the actuating lever, setting faces risingly extending in the supporting region, and with a connecting element connecting the actuating lever with the blocking pawl at a distance from the pivot axis of the blocking pawl.

2. A lower steering arm assembly according to claim 1, wherein the connecting element being a tow bar, said actuating lever is pivotably arranged on said tow bar, with the longitudinal axis of the tow bar forming the axis of rotation for the actuating lever and the actuating lever, in at least one direction of the longitudinal axis, which corresponds to the direction of moving the tow bar into the open position, being firmly supported on the tow bar.

3. A lower steering arm assembly according to claim 1, wherein two actuating arms extending diametrically from the pivot axis of the actuating lever and both of said actuating arms associated with a setting contour.

4. A lower steering arm assembly according to claim 1, wherein the actuating lever is associated with at least one securing arm, said securing arm arranged so as to be circumferentially offset relative to the actuating arm and when the actuating arm, in the locked position, is in contact with the base of the setting contour, the at least one securing arm being covered by a fixed securing projection which prevents the blocking pawl from being displaced into the open position.

5. A lower steering arm assembly according to claim 4, wherein two securing arms extend diametrically away from the pivot axis and two securing projections.

6. A lower steering arm assembly according to claim 1, wherein the recess of the strut and the blocking pawl, the actuating lever, the connecting element and the setting contour are associated with the attaching end which can be plugged onto the second end of the strut.

7. A lower steering arm assembly according to claim 6, wherein the blocking pawl is received in a pocket of the attaching end and that the connecting element in the form of a tow bar is guided outwardly through a bore and, on the outside, rotatably carries the actuating lever.

8. A lower steering arm assembly according to claim 6, wherein a stop bushing being arranged co-axially around the tow bar, said stop bushing displaceable accommodated in a bore, one end of said stop bushing being axially supported on the actuating lever held at the tow bar in only one longitudinal direction, and the other end of said stop bushing serving as a securing stop for the blocking pawl.

9. A lower steering arm assembly according to claim 1, wherein the actuating lever is held in contact with the setting contour by a spring disc.

10. A lower steering arm assembly according to claim 6, wherein the actuating lever is axially fixably connected to the tow bar.

\* \* \* \* \*